No. 791,115. PATENTED MAY 30, 1905.
W. C. STEPHENS.
CHUCK OR TOOL HOLDER FOR ROCK DRILLING MACHINES.
APPLICATION FILED JUNE 16, 1904.
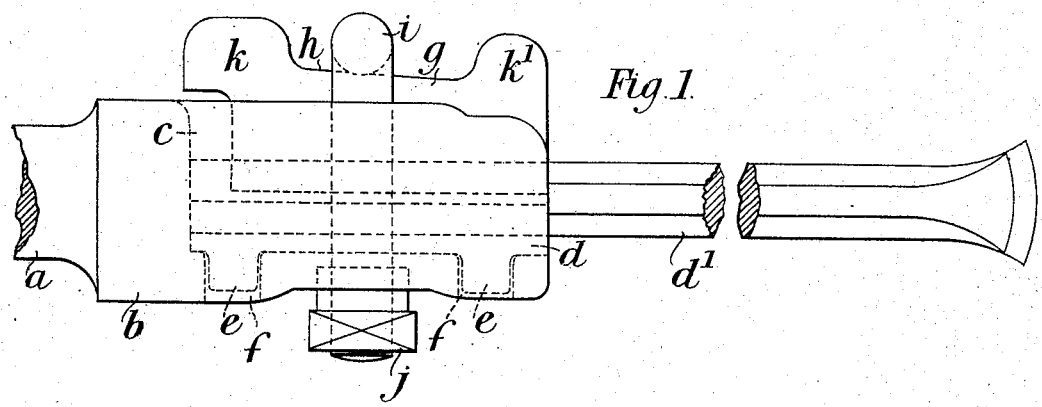
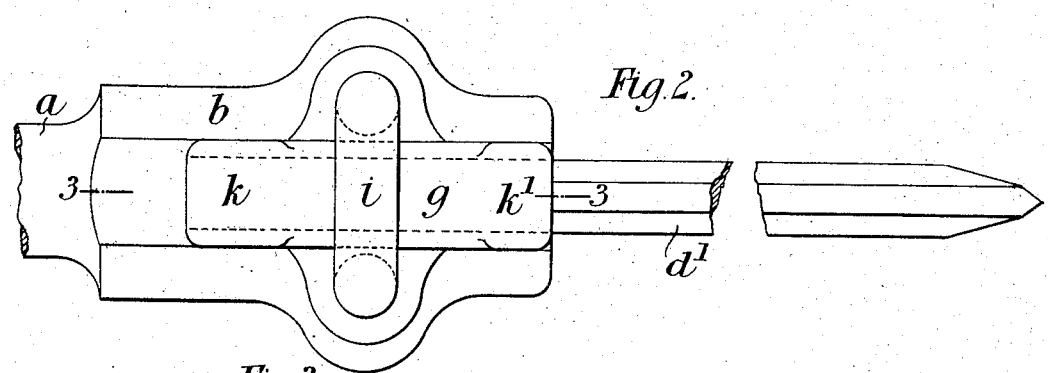
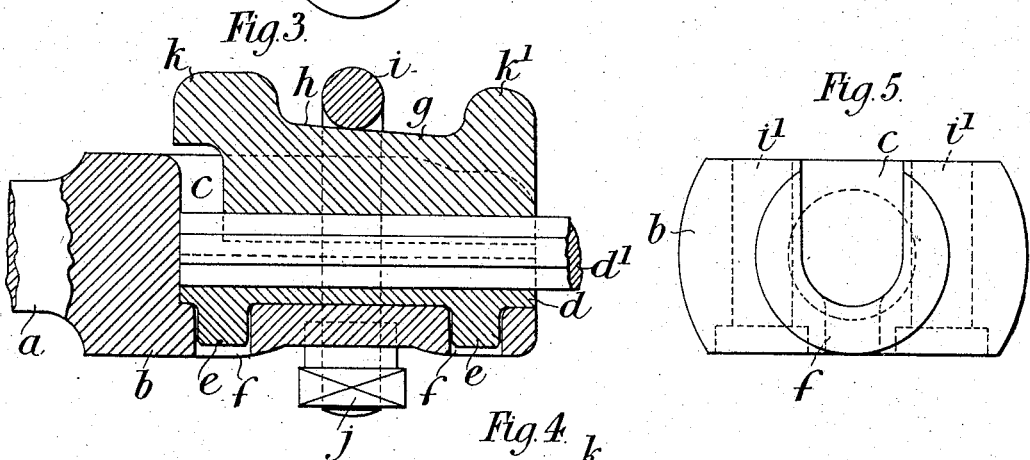
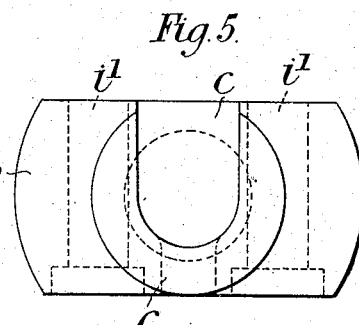
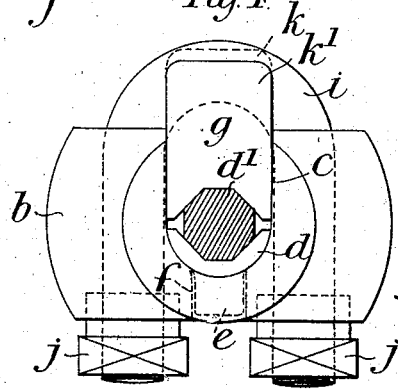
Witnesses.
J. K. Moore
F. H. Hubbard
Inventor.
William C. Stephens
By Whitaker & Prevost
Attys.

No. 791,115. Patented May 30, 1905.

UNITED STATES PATENT OFFICE.

WILLIAM CHARLES STEPHENS, OF CARN BREA, ENGLAND.

CHUCK OR TOOL-HOLDER FOR ROCK-DRILLING MACHINES.

SPECIFICATION forming part of Letters Patent No. 791,115, dated May 30, 1905.

Application filed June 16, 1904. Serial No. 212,843.

*To all whom it may concern:*

Be it known that I, WILLIAM CHARLES STEPHENS, a subject of the King of Great Britain, residing at the "Climax" Drill Works, Carn Brea, county of Cornwall, England, have invented new and useful Improvements in Chucks or Tool-Holders for Rock-Drilling Machines, of which the following is a specification.

My invention relates to chucks or tool-holders for rock-drilling machines.

In chucks or tool-holders as heretofore constructed for rock-drilling machines it has been usual to employ a gripping-padway and gripping-pad or other loose piece and also a wedge for forcing the gripping-pad onto the drill-shank. This arrangement, however, is defective, in that when the tool is to be removed or changed the gripping-pad or the like and the wedge usually fall out of place and have to be readjusted. Furthermore, the gripping-padway and gripping-pad have usually to be shaped to correspond with the shape of the drills to be used.

The chief object of my invention is to construct a chuck or tool-holder which is adapted for receiving drills of round, octagonal, hexagonal, or other shape with equal facility and wherein the parts will not fall out of place, whereby the tools may be removed and replaced with greater facility than heretofore.

According to my invention one portion of the chuck is made integral with the piston-head and carries a half-bushing which can be readily renewed, and in conjunction with this half-bushing I make use of a combined wedge and gripping-pad, which is held in position by a U-shaped bolt, strap, or stirrup which embraces the combined pad and wedge and is secured in the solid portion of the chuck, the employment of the combined wedge and gripping-piece rendering the intervention of a loose piece between the wedge and the tool unnecessary.

To enable my invention to be fully understood, I will describe the same by reference to the accompanying drawings, in which—

Figure 1 is a side elevation, and Fig. 2 a plan, of a chuck or tool-holder constructed according to my said invention. Fig. 3 is a section on the line 3 3, Fig. 2. Fig. 4 is an end view of the chuck. Fig. 5 is a view of a detail.

$a$ is the piston-rod, and $b$ the part of the tool-holder preferably formed integral therewith and which for convenience of description I will hereinafter refer to as the "fixed part." This fixed part, which is shown separately in Fig. 5, has formed in it a U-shaped recess $c$, the opposite sides of which are parallel, and into the bottom of this recess is inserted the half-bushing $d$, which, as shown, is provided with two lugs $e\ e$, which enter corresponding retaining-recesses $f\ f$ in the fixed part $b$ and serve to retain the said half-bushing in place. This half-bushing is of such thickness that the axial line of the tool $d'$ lying upon it shall be in axial alinement with the piston.

$g$ is the gripping-pad, which is formed with the surface $h$ inclined to the surface of the pad which comes into contact with the tool, so that it will act also as a wedge. This combined pad and wedge is adapted to enter between the parallel sides of the recess $c$ in the fixed part and to come directly into contact with the tool without the intervention of a separate piece.

It will be understood that the adjacent surfaces of the half-bushing and gripping-pad will be suitably shaped to receive the drills. In practice I prefer to form each with three sides of an octagon.

$i$ is the U-shaped bolt, strap, or stirrup which embraces the combined pad and wedge and which is passed through holes $i'$ in the fixed part $b$ and held in position by nuts $j\ j$. This U-shaped bolt $i$ may be of such width as to be clear of the half-bushing $d$, as shown, or it may be narrower than the said bushing and pass through slots in the sides of the same, so as to hold the said bushing against endwise movement, and thereby render the use of the lugs $e\ e$ and holes $f\ f$ unnecessary.

The pad $g$ has formed upon it at its ends two ribs or lugs $k\ k'$, which serve for preventing the pad from becoming disconnected from the strap $i$ and also afford a surface which may be readily struck with a hammer for tightening the wedge to secure the tool, or vice versa. The said pad is arranged with its smaller end adjacent to the outer end of the tool-holder, so that during the working of the drill the momentum of the pad will tend to force it more tightly onto the drill.

With the arrangement hereinbefore described it will be understood that a tool having been inserted in position into the socket formed between the bushing $d$ and the pad $g$ by driving the pad in the proper direction the inclined surface $h$ will cause the said pad to be wedged tightly onto the tool, and thereby grip the same, and that the tool can be as readily loosened by driving the pad in the reverse direction. The outer ends of the half-bushing $d$ and pad $g$ may be tapered or chamfered to allow of the ready introduction of the drills.

In addition to the advantages before mentioned my invention possesses the further following advantages as compared with drill-chucks as heretofore constructed—that is to say, it comprises fewer pieces and is less expensive to manufacture. It is more readily and cheaply renewed, as when worn the half-bushing $d$ can either be replaced or packed up with a liner, and it is much more compact and describes a much smaller circle when rotating.

Having now particularly described and ascertained the nature of my said invention and in what manner the same is to be performed, I declare that what I claim is—

In a tool-holder, the combination with a fixed portion provided with a longitudinal recess, having retaining-recesses in its bottom face, a removable bushing fitted in said recess and provided on its outer face with integral lugs engaging said retaining-recesses, and on its inner face with a tool-engaging portion, a gripping-pad located in said recess in the fixed part and having its inner face provided with a tool-engaging portion opposed to the tool-engaging portion of the bushing and its outer portion provided with a straight inclined face, a U-shaped strap directly engaging the inclined face of said pad, and having its ends passing through apertures in the fixed portion, and nuts engaging the ends of said strap, substantially as described.

WILLIAM CHARLES STEPHENS.

Witnesses:
W. H. DANIELL,
W. J. WALTON.